United States Patent [19]
Bowser

[11] 3,986,621
[45] Oct. 19, 1976

[54] FLAP SENSOR AND HOIST POSITION CONTROL FOR PALLETIZER

[75] Inventor: Robert E. Bowser, Lynchburg, Va.

[73] Assignee: Simplimatic Engineering Co., Lynchburg, Va.

[22] Filed: Oct. 21, 1975

[21] Appl. No.: 624,465

[52] U.S. Cl. .................. 214/6 P; 53/164; 53/387; 214/6 H
[51] Int. Cl.² ........................................ B65G 57/24
[58] Field of Search .............. 214/6 H, 6 P, 6 DK, 214/128; 53/164, 387; 187/35, 36

[56] References Cited
UNITED STATES PATENTS

| | | | |
|---|---|---|---|
| 3,698,572 | 10/1972 | Dahlem et al. | 214/6 DK |
| 3,765,145 | 10/1973 | Davis | 53/387 X |
| 3,856,158 | 12/1974 | Currie | 214/6 DK |

FOREIGN PATENTS OR APPLICATIONS

| | | | |
|---|---|---|---|
| 1,178,961 | 1/1970 | United Kingdom | 214/6 H |

*Primary Examiner*—L. J. Paperner

[57] ABSTRACT

Apparatus is provided for sensing the position of the top of a carton situated on an upwardly moving hoist beneath the draw plate of a palletizer. The carton top has a flap thereon which, in some instances, is partially opened and which will require a given force to close it such that it does not interfere with the sensing of the position of the top of the carton. The apparatus terminates the upward movement of the hoist when the top of the carton is in the desired position and then withdraws to permit the draw plate to deposit the next tier of cartons on the hoist. The apparatus comprises a support situated below the draw plate and a movable carriage mounted on the support. An element extending from the carriage, which normally intersects the path of movement of the carton, is mounted on the carriage for limited pivotal movement with respect thereto in response to a movement of the top of the carton, between an initial pivotal position along the path prior to the desired position of the carton top and a final pivotal position corresponding to the desired position of the carton top. Means are provided for urging the element towards the initial position by exerting a force on the element greater than the force required to close the flap, if same is opened. Control means are operatively connected to the element for actuation when the element is in the final pivotal position to terminate the movement of the hoist and to actuate means for moving the carriage to a position where the element is withdrawn from the path of carton movement so that the area above the carton is unobstructed. Means are provided for preventing the element from abruptly "snapping back" due to the urging thereof towards its initial pivotal position, as the carriage is withdrawn.

22 Claims, 6 Drawing Figures

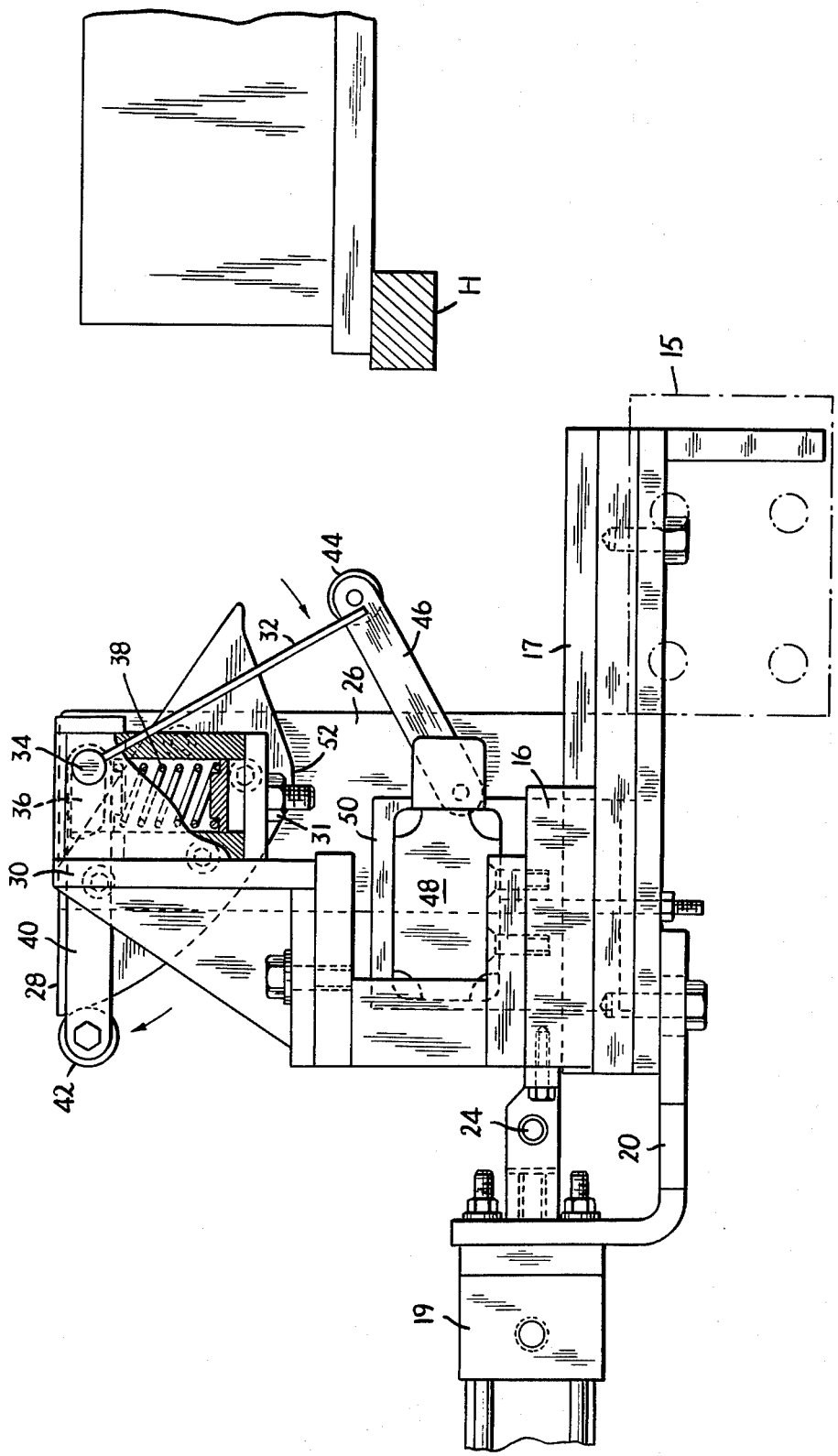

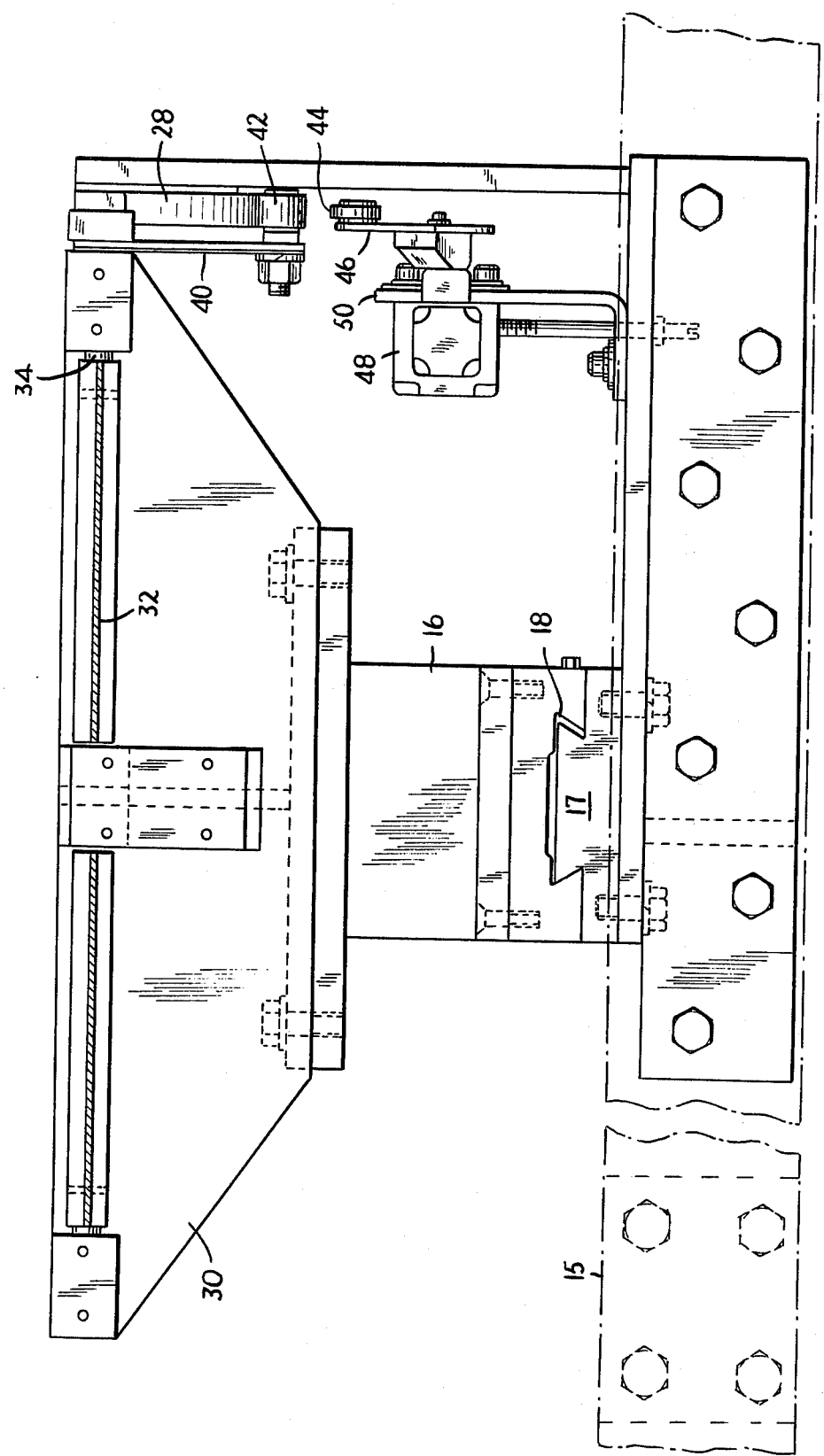

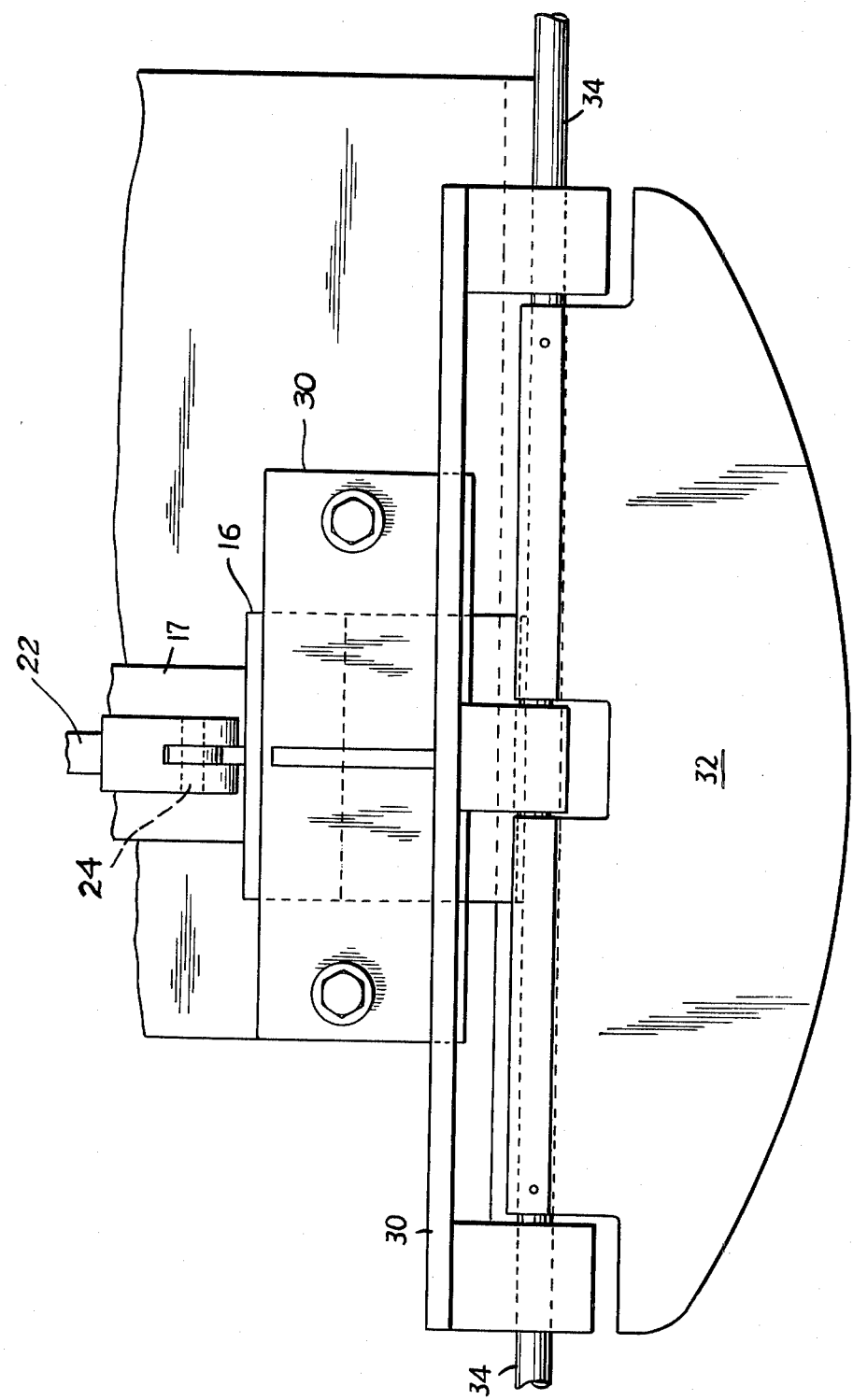

FLAP SENSOR AND HOIST POSITION CONTROL FOR PALLETIZER

The present invention relates to palletizers and, in particular, to a flap sensor for controlling the position of the palletizer hoist without obstructing the area thereabove.

A palletizer is a mechanism which arranges incoming cartons or other objects thereinafter generally termed "cartons" for purposes of simplicity, into tiers or layers and then deposits the tiers or layers of cartons successively onto a pallet which, when fully loaded, can be removed from the mechanism by a forklift truck or the like for storage or shipping. Palletizers are manufactured in a variety of different forms, but in general may comprise a carton orienting means, a row forming means, a layer or tier forming means, a draw plate upon which the formed layer or tier is situated, an elevator or hoist located below the draw plate upon which the formed layers or tiers are successively deposited, and a means for conveying empty pallets to the elevator or hoist and for removing loaded pallets from the elevator or hoist.

Preferably, the carton orienting means includes a carton inverter and a means for turning the carton through a 90° angle. Adjustable pattern guides and stop plates may also be provided. In automatic palletizers, the functions of the various portions of the mechanism are synchronized and controlled by a main control unit which may be programmable through the use of tape or other program media. By controlling the case inverter, the means for turning the case 90°, the stops and guides, a large variety of different load patterns can be achieved to provide the load stability and degree of compactness required by the particular size, shape and weight of the cartons involved.

It is often necessary that cartons having closed but unsealed flaps must be loaded by the palletizer. The unsealed flaps may partially open during the loading procedure and interfere with the correct positioning of the hoist with respect to the draw plate. Since the tier or layer of cartons formed on the draw plate will fall onto the hoist as the draw plate is withdrawn, it is necessary that the top layer of cartons on the hoist be positioned immediately below the draw plate such that the cartons fall only a short distance, thereby preventing the breakage of the contents thereof. In order to insure that the cartons fall only a short distance, the top surface of the top layer of cartons on the hoist is sensed when positioning the hoist with respect to the draw plate and the hoist is positioned such that the top surface of the cartons on the top layer thereof is immediately below the draw plate.

Because the sensing apparatus must not obstruct or interfere with the cartons on the hoist or the subsequent layer or tier of cartons which is being deposited thereon, photosensitive means have often been used to sense the height of the hoist. In these instances, a light source is situated on one side of the path of travel of the hoist beneath the draw plate at the desired position of the top surface of the top layer or tier of cartons on the hoist. The photo-sensitive means is situated on the other side of the path such that when the top surface of the top layer or tier of cartons on the hoist interrupts the light beam, the photo-sensitive means automatically terminates the hoist movement thereby positioning the top surface of the top layer or tier of cartons immediately below the draw plate.

However, if a flap on the top of one of the cartons on the top layer or tier of the hoist is partially opened, this flap will interrupt the light beam prematurely, thereby causing the elevator to stop with the top surface of the top layer on the hoist several inches below the draw plate. Thus, as the next layer or tier is deposited on the hoist, it will drop a distance which is larger than anticipated, thereby tending to break or damage the contents of the cartons.

It is, therefore, a prime object of the present invention to provide a flap sensor which may be utilized to correctly position the hoist of a palletizer and which will not stop the hoist or elevator prematurely if an opened flap is encountered.

It is another object of the present invention to provide a flap sensor which will correctly position the hoist of a palletizer without interfering with or obstruct the depositing of the cartons on the hoist.

It is a further object of the present invention to provide a flap sensor which is automatically withdrawn from the path of movement of the hoist of a palletizer.

It is still another object of the present invention to provide a flap sensor which will not "snap back" abruptly as it is being withdrawn from the path of movement of a hoist of a palletizer.

It is still a further object of the present invention to provide a flap sensor manufactured of a plurality of relatively simple and inexpensive parts which function together reliably and which can be easily integrated into a fully automatic palletizer system.

In accordance with the present invention, apparatus is provided for sensing the position of the top of a carton, without obstructing same, the carton having a flap thereon which, in some instances, is partially opened and which will require a given force to move the flap to the closed position. The apparatus also deactuates the carton moving mechanism, upon which the carton is situated, when the top of the carton is in a given position. The apparatus includes a support, the mechanism moving the carton relative to the support in a first direction. A carriage is mounted on the support. An element extending from the carriage, normally intersecting the path of movement of the carton, is mounted on the carriage for limited movement with respect thereto in response to the movement of the carton, between a first position along the path prior to the given position and a second position corresponding to the given position. Means are provided for urging the element towards the first position by exerting a force on the element greater than the force required to close the flap, if same is open. Further, control means are operably connected to the element for actuation when the element is in the second position to deactuate the carton moving mechanism. Means for moving the carriage in a second direction relative to the housing to a position wherein the element is withdrawn from the path are also provided.

The element is pivotally mounted on the support and has a torque applied thereto tending to urge it towards its initial position. This torque continues to be applied even after the element has been moved to the second position. As the carriage moving means withdraws the element from the path of movement of the carton moving mechanism, the tip of the element moves along the top of the carton and will tend to snap back abruptly as it passes over the corner of the carton.

In order to prevent this deletorious snapping back action, a cam is provided mounted on the support and a cam follower is mounted for movement with the element. Before movement of the carriage, the cam follower will be spaced from the cam if the element has been pivoted from the first position to the second position by the carton top. The contour of the cam is such that as the carriage is moved to the point where the tip of the element passes over the corner of the carton, the cam follower will be immediately adjacent the surface of the cam. Thus, the cam will prevent any abrupt snapping back of the element as the element is withdrawn.

The torque exerted on the element by the urging means is greater than the force required to close the flap. The element cannot be moved to the second position by an open flap, but only by the top surface or wall of the carton. Therefore, the flap is closed by the element before being moved to the second position, thereby preventing premature termination of the movement of the hoist.

The carriage moving means moves the carriage, and thus the element and the cam follower mounted for movement therewith, in a direction substantially perpendicular to the movement of the hoist or elevator. When the element is moved to the second position, the control means causes the hoist to terminate its movement and, in addition, actuates the carriage moving means to withdraw the element from the path of movement of the hoist, thereby assuring that this path is not obstructed.

The control means preferably comprises a limit switch actuated by the movement of the cam follower. After the limit switch has been actuated and the carriage begins to withdraw, the contour of the cam prevents abrupt snapping back of the element, as indicated above.

To the accomplishment of the above and such other objects as may hereinafter appear, the present invention relates to a flap sensor and hoist position control as set forth in the claims and as described in the specification, taken together with the accompanying drawings wherein like numerals refer to like parts and in which:

FIG. 2C is a front elevational view of the flap sensor and hoist position control of the present invention showing the carriage in the final withdrawn position;

FIG. 3 is a side elevational view of the flap sensor and hoist position control of the present invention; and FIG. 4 is a top elevational view of the flap sensor and hoist position control of the present invention.

Figure 1:
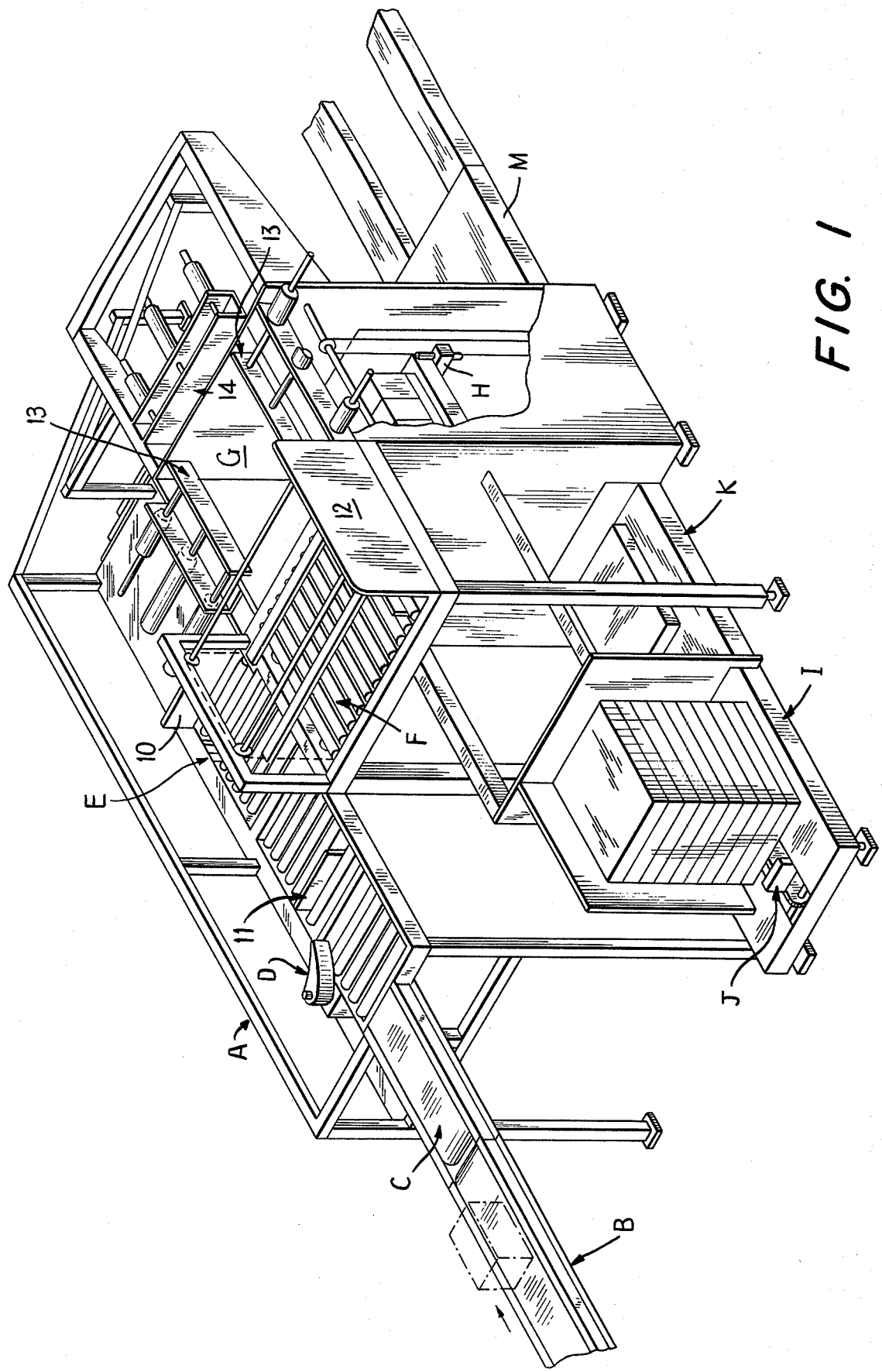
FIG. 1 is an isometric view of a palletizer of the type which may utilize the flap sensor and hoist position control of the present invention.

The flap sensor and hoist position control of the present invention can be used in conjunction with a variety of automatic palletizers having different components which may be arranged in a variety of different orientations. However, for purposes of illustration only, FIG. 1 depicts an automatic palletizer representative of the type of palletizers with which the present invention may be used. The palletizer comprises a support structure, generally designated A, including vertical and horizontal supporting elements as well as an operators' platform and stairways providing access thereto. Structure A supports the various components of the palletizer as well as the platforms and stairways. Structure A may be arranged in a variety of different manners depending upon the particular requirements of the palletizer.

Cartons having closed but unsealed flaps enter the palletizer by an in-feed conveyor, generally designated B. Apparatus for flap closing and setting (not shown) and for carton inverting (not shown) may be utilized prior to in-feed conveyor B, if desired. The flap closer and setter acts on the flaps on the carton to the degree that they will be stackable without further manipulation. The basic operation of such a flap closer and setter may take place in two steps. First, the carton flaps are closed by means of air-actuated arm and preset flap guides. Thereafter, the flap setter crimps the carton flap by means of a series of rollers. After the flaps are closed and set, the carton may be transferred to a carton inverter which may invert the carton or not, in accordance with the loading requirements.

As the cartons enter the palletizer by means of infeed conveyor B, they are metered by a brake-meter belt, generally designated C, one at a time, passing a photoelectric cell (not shown). The photoelectric cell counts the carton into the proper program pattern sequence. The brake-meter belt C delivers the carton to a carton turning apparatus, generally designated D, which serves to turn or rotate the carton 90°, if such a directional reorientation is called for by the program. Turning means C comprises an arm or flipper pivotally mounted on the side of the carton path which, when appropriately positioned, engages one corner of the carton causing the carton to rotate about that corner such that the carton is reoriented 90° with respect to its original position.

The carton is then conveyed to a row forming table, generally designated E, wherein the appropriate number of cartons are accumulated to form a row. The row forming means may comprise a conveyor style roller table having a plurality of individually powered rolls. A full solid row of cartons are formed against each other and held by a fixed but positioned adjustable back stop 10. Should the row formation require spaces between the cartons, one or more row stops (not shown) may be raised by a pneumatic cylinder (not shown) between the driven rolls of the row table. The row stops are adjusted to proper spacing for the various carton sizes and pattern variations. When the row is completed, a row gate 11 is raised in a manner similar to that of the row stops. Row gate 11 separates the incoming cartons from the completed row until the row sweep is completed. After the row sweep is completed, the row gate retracts and the next row continues to form.

The row sweep (not shown) pushes the formed row onto a tier forming table, generally designated F, which is a conveyor-style roller table similar to the row forming table. After the row sweep has placed the row on the tier table, the rollers thereon are driven to advance the row one row width, thus permitting clearance space for receiving the next row in sequence. When the total number of rows required to form a full tier or layer have been placed on the tier table F, the rolls are driven to advance the cases against a tier table stop 12. The tier table is preferably provided with a fixed but position adjustable back stop 12 and pneumatically raised stops (not shown) similar to those in the for forming table. These stops are used either as back stops, which position the tier at the proper position for a tier sweep, or to create separation on the tier formation to assist in maintaining pattern spaces. After the entire tier is formed in position on the tier table F, the full tier is swept on to the draw plate, generally designated G, by a sweeping apparatus (not shown). The tier pattern is guided onto the draw plate G by side guides 13, adjusted to the dimensional width of the pattern and is swept against a back stop guide 14, position adjustable to the length of the pattern. When the pattern is in place on the draw plate G, the back stop guide 14 holds the tier pattern in position for retraction of the draw plate G.

Immediately beneath draw plate G is a vertically movable hoist or elevator, generally designated H, upon which a pallet is situated. A stack of pallets is placed in the pallet in-feed area, generally designated I. One pallet at a time is removed from the bottom of the stack and transferred by means of a pallet moving mechanism J to a pallet ready stage, generally designated K, wherein it will be loaded on hoist H immediately after the removal of the loaded pallet therefrom. The loaded pallet is transferred to a loaded pallet outfeed area, generally designated M, where it may be conveniently removed by a fork lift truck or the like or, alternatively, automatically transferred to a storage area.

The palletizer is controlled to sense the proper hoist position, and thus the draw plate G cannot retrace until hoist H is in the proper position. When the cartons being palletized have opened top flaps, the flap sensor and hoist position control of the present invention is utilized, as described in detail below, to correctly position the hoist H. When hoist H is in the appropriate position with respect to draw plate G, the draw plate withdraws thereby depositing a tier or layer of cartons on the pallet or, if present, on the top layer of cartons on the pallet. Hoist H will then move downwardly to a distance wherein the top of the top layer of cartons thereon clears the path of movement of the draw plate and the draw plate returns to its original position. The hoist H then moves upwardly until the top surface of the top layer of cartons is sensed by the flap sensor and hoist position control of the present invention, which will automatically position the hoist at a position wherein the next layer or tier may be placed thereon. After the pallet on hoist H is fully loaded, the hoist is moved downwardly to its bottom position wherein the loaded pallet is removed and a new pallet placed thereon. The new pallet is then moved upwardly to the appropriate position for receiving the first layer or tier of cartons thereon.

The flap sensor and hoist position control of the present invention, as shown in FIGS. 2A, 2B, 2C, 3 and 4, is situated in the hoist section underneath the draw plate G and is utilized in the palletizing of cartons with closed but unsealed flaps. It is necessary to control the position of the hoist H for the correct dropping distance between the draw plate G and the top layer of cartons on the hoist to prevent damage to the contents of the carton. The hoist H, after receiving a completed tier pattern, will lower until the top surface of the cartons thereon are clear for the draw plate to return to the closed position. As the draw plate closes, the flap sensor will slide into sensing position. The flap sensor is a cam spring balance which projects into the area over the open flaps. The open flap will not deflect the sensor, but when the flap has been folded down against the carton top and is firm in position, the movement of the top of the carton will cause the sensor to overbalance, thus stopping the upward travel of the hoist H at the proper position. When the hoist has completely stopped, the flap sensor will slide clear of the tier pattern area.

The flap sensor and hoist position control comprises a support 15 which is fixedly mounted to structure A beneath draw plate G, immediately adjacent the path of movement of hoist H. Hoist H vertically moves the tier of cartons relative to draw plate G situated above support 15. A horizontally movable carriage 16 is movable along support 15 by means of a guide 17 which fits into a recess 18 in carriage 16 such that carriage 16 is movable with respect to support 15 in a direction substantially perpendicular to the movement of hoist H. The movement of carriage 16 is controlled by a cylinder 19 which is fixedly mounted on support 15 by means of a bracket 20. The piston rod 22 of cylinder 19 is connected to carriage 16 by means of a pin 24. An upstanding bracket 26 is mounted to support 15 and has situated thereon a cam 28 at a position spaced from support 15.

Figure 2A:
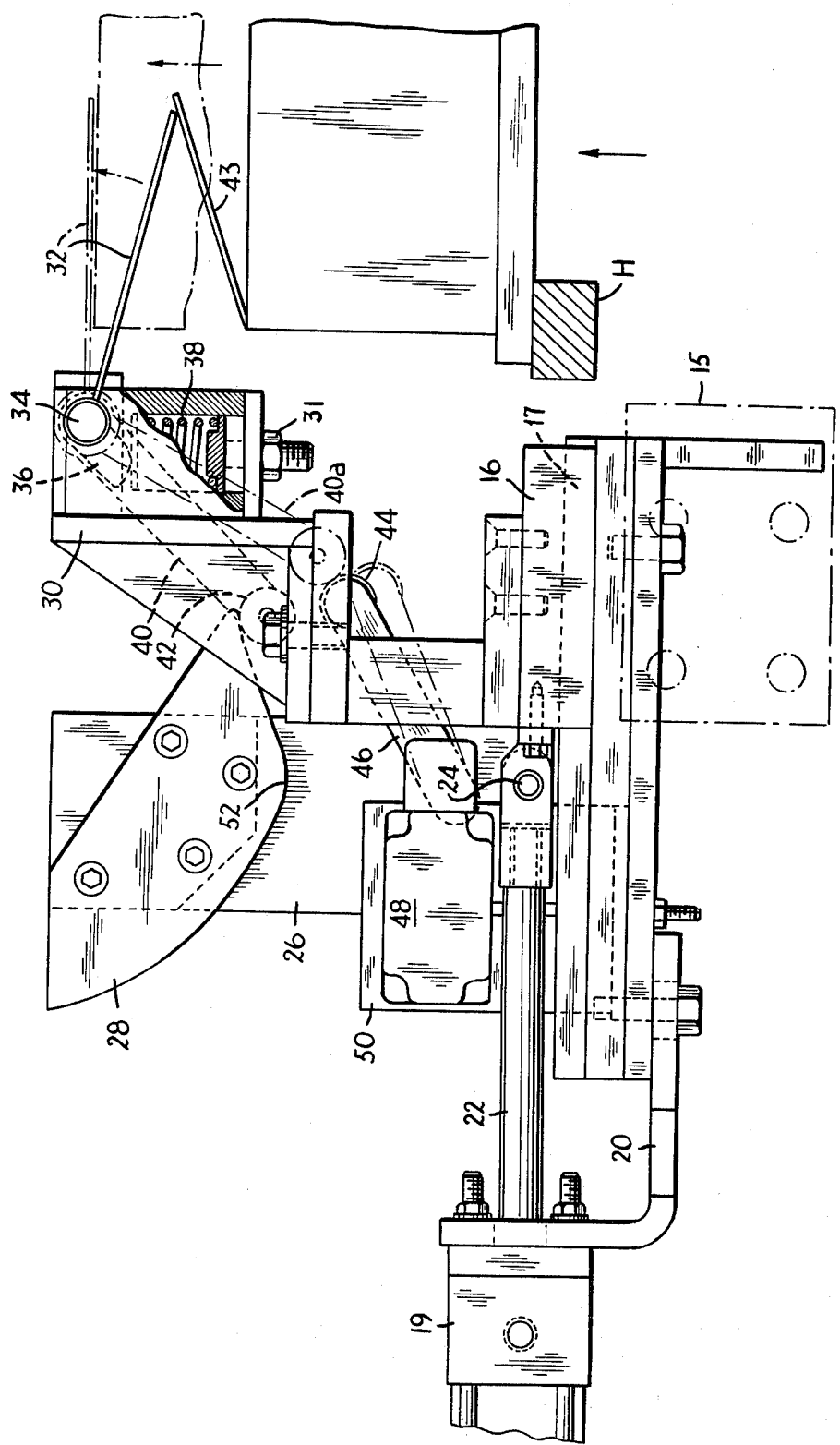
FIG. 2A is a front elevational view of the flap sensor and hoist position control of the present invention showing the carriage in its initial position.
Figure 2B:
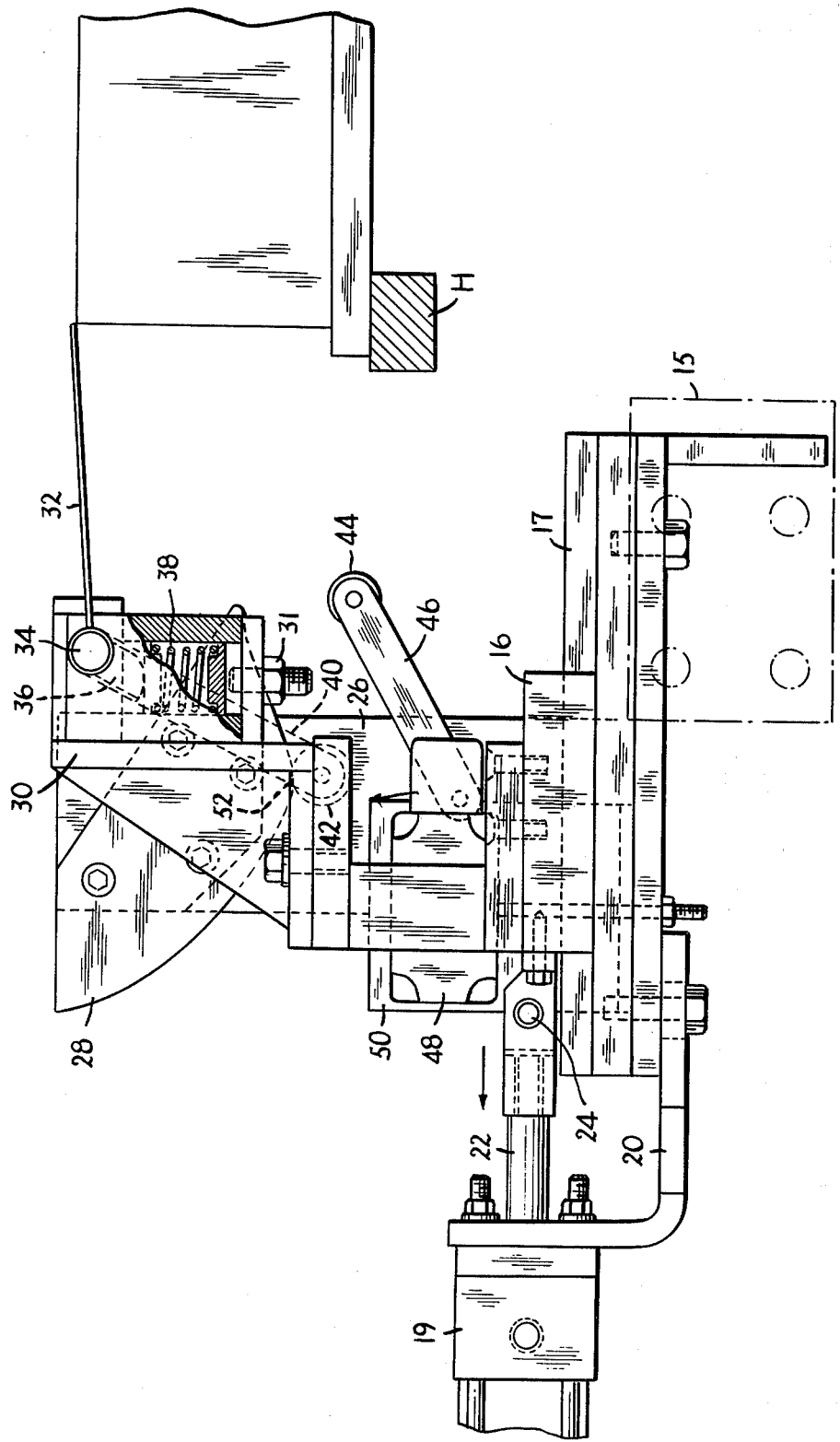
FIG. 2B is a front elevational view of the flap sensor and hoist position control of the present invention showing the carriage in an intermediate position, as it is being withdrawn.

Carriage 16 has mounted thereon a housing 30 to which a generally semi-circular element 32 is pivotally mounted by means of a shaft 34. Element 32 is contoured as shown in FIG. 4 in a manner which enables it to act in the most efficient manner upon a partially opened flap to close and to retain the flap in the closed position. Element 32 extends from housing 30 and normally intersects the path of movement of the cartons on hoist H. Shaft 34 has mounted thereon a finger 36 which is spring loaded by a spring 38 mounted within housing 30. A set screw 31 is provided to adjust the tension on spring 38. Spring 38 tends to pivot finger 36 about shaft 34 in a clockwise direction (as shown in FIGS. 2A, 2B and 2C) such that element 32 is pivoted in a clockwise direction towards its initial pivotal position, as shown in solid in FIG. 2A. Also extending from shaft 34 is an arm 40 having thereon a cam follower 42 preferably in the form of a roller.

In the initial pivotal position of element 32, cam follower 42 rests on the surface of cam 28. After the formed tier of cartons has been transferred from tier table F to draw plate G, the hoist motor (not shown) is actuated by the main control unit of the palletizer to move the hoist towards the draw plate. As the carton on hoist H is moved vertically upward, the partially opened flap 43 thereon engages element 32. Spring 38 exerts a torque on finger 36 and thus element 32 which is greater than the force required to close the open flap 43 so that as the carton moves vertically upward, the flap is pushed to the horizontal or closed position by element 32. As the top surface of the carton abuts element 32, the element is pivoted against the urging of spring 38 into its horizontal or second position, shown in phantom in FIG. 2A. As this occurs, arm 40 and cam follower 42 are pivoted in a counterclockwise direction (as shown in FIG. 2A) to position 40a. In this position, cam follower 42 is spaced from the surface of cam 28 and engages a second roller 44 which is situated in the path of movement of cam follower 42. Roller 44 is mounted on an arm 46 which is the actuation arm of a limit switch 48 which is mounted to support 15 by means of a bracket 50. When actuation arm 46 is moved to the position shown in phantom in FIG. 2A, the limit switch is actuated. The actuation of limit switch 48 is sensed by the control unit which deactuates the hoist motor and, in addition, controls the fluid source which actuates cylinder 19.

When the top surface of the carton moves element 32 into its horizontal position, thereby causing cam follower 42 to actuate limit switch 48, limit switch 48 causes the control unit to deactuate the hoist motor and thus terminate the movement of hoist H positioning the top surface of the top layer or tier of cartons in the appropriate position below draw plate G. Simultaneously, cylinder 19 is actuated by the control unit, thereby moving carriage 16 in a horizontal direction away from hoist H. The movement of carriage 16 causes element 32 to withdraw from the path of movement of the cartons thereby assuring that it will not obstruct the tier of cartons to be loaded on the hoist.

As carriage 16 is moved, the exterior tip of element 32 will slide along the top surface of the cartons until it reaches the corner formed by the top surface of the carton and the wall thereof facing the flap sensor and hoist position control (see FIG. 2B). Because of the urging of spring 38 on finger 36, as the exterior tip of element 32 passes over this corner, the element would normally snap back abruptly to its initial pivotal position. In order to prevent this abrupt snapping back, cam 28 is shaped and situated in such a manner so that cam follower 42 will abut against point 52 on the contour of cam 28 as the exterior tip of element 32 moves over the corner of the carton. In this manner, the contour of cam 28 serves to prevent the urging of spring 38 from causing element 32 to abruptly snap back towards its initial pivotal position. As the carrier 16 continues to move, cam follower 48 will ride along the contour of cam 28.

FIG. 2C shows carriage 16 in its withdrawn position. As carriage 16 moves from the position shown in FIG. 2B to the position shown in FIG. 2C, roller 52 on arm 40 follows the upwardly sloping contour of cam 28 such that element 32 is moved in a clockwise direction to a position which is almost vertical. In this manner, the area adjacent the path of hoist H is unobstructed when the carriage is withdrawn. This is required because in some instances the draw plate G may be set up such that the roller supporting the draw plate may have to transverse this area. Thus, the contour of cam 28 assures that this element 32 will be pivoted to a position such that it will not interfere with this draw plate support roller.

When carriage 16 has completed its movement, draw plate G will open depositing another layer or tier of cartons on hoist H. Hoist H will be caused by the control unit to move downwardly so that the top layer of cartons will clear the path of travel of the draw plate and the draw plate will return to its original position. At this point, cylinder 19 is actuated by the control unit to move carriage 16 back to its original position such that element 32 is located above the top surface of the top layer or tier of cartons on hoist H and is downwardly inclined, as shown in solid lines in FIG. 2A. The hoist is again moved towards the draw plate until the flap sensor and hoist position control of the present invention appropriately positions the hoist with respect to the draw plate.

Thus, the present invention is a flap sensor and hoist position control which will close the flap of the top surface of the carton on the top layer of the hoist such that the hoist will not stop prematurely if an open flap is encountered. Further, the element is withdrawn from the path of movement of the cartons such that this path is not obstructed or interfered with. Moreover, the present invention prevents the abrupt snapping back of the element as the sensor is withdrawn from the path of movement of the cartons. The present invention is comprised of a plurality of simple and relatively inexpensive parts which function together reliably and which, as an entity, can be easily integrated into a fully automatic palletizer system.

While only a single embodiment of the present invention has been disclosed herein, it is obvious that many variations and modifications may be made thereon. It is intended to cover all of these variations and modifications which fall within the scope of the present invention as set forth in the following claims.

I claim:

1. Apparatus for sensing the position of a wall of a carton, without obstructing same, said wall having a flap thereon which is some instances may be partially opened and which will require a given force to move said flap to the closed position and for deactuating a carton moving mechanism, upon which the carton is situated, when said wall is in a given position, said apparatus comprising a support, said mechanism moving said carton relative to said support in a first direction, a carriage mounted on said support, an element extending from said carriage normally intersecting the path of movement of said wall and mounted on said carriage for limited movement with resepct thereto, in response to the movement of said wall, between a first position along said path prior to said given position and a second position corresponding to said given position, means for urging said element towards said first position by exerting a force on said element greater than said given force required to close the flap, if same is present and opened, control means operatively connected to said element for actuation when said element is in said second position to deactuate said carton moving mechanism, and means for moving said carriage in a second direction relative to said housing to a position wherein said element is withdrawn from said path.

2. The apparatus of claim 1 wherein said element is pivotally mounted on said carriage.

3. The apparatus of claim 1 wherein said urging means exerts a torque on said element.

4. The apparatus of claim 1 wherein said second direction is substantially perpendicular to said first direction.

5. The apparatus of claim 1 further comprising a cam mounted on said housing and a cam follower mounted for movement with said element, the contour of said cam defining said first position of said element.

6. The apparatus of claim 5 wherein said urging means urges said cam follower towards said cam.

7. The apparatus of claim 5 wherein said cam follower contacts said cam at a given point when the exterior end of said element passes over the corner of the wall of the carton, as said carriage is moved in said second direction.

8. The apparatus of claim 7 wherein the movement of said element causes said cam follower to be spaced from said cam at one or more points along the contour of said cam prior to said given point.

9. The apparatus of claim 7 wherein said cam follower contacts said cam at all points along the contour thereof subsequent to said given point.

10. The apparatus of claim 1 wherein the initiation of the movement of the said means for moving said carriage is synchronized with the termination of the movement of the mechanism.

11. The apparatus of claim 1 wherein said control means actuates said carriage moving means.

12. A palletizer comprising a support, a hoist movably mounted to said support, article depositing means mounted on said support above said hoist and adapted to deposit layer of articles on said hoist, means for moving said hoist to a given position to accept the articles thereon and means for sensing the position of the top surface of the top layer of articles on said hoist, without obstructing same, corresponding surface having a flap thereon which in some instances may be partially opened and which will require a given force to move said flap to a closed position and for deactuating said moving means when said surface is in said given position comprising a carriage mounted on said support, an element extending from said carriage, normally intersecting the path of movement of said surface and mounted on said carriage for limited movement with respect thereto, in response to the movement of said surface, between a first position along said path prior to said given position and a second position corresonding to said given position, means for urging said element towards said first position by exerting a force on said element greater than said given force required to close the flap, if same is present and opened, control means operatively connected to said element for actuation when said element is in said second position to deactuate said moving means and means for moving said carriage to a position wherein said element is withdrawn from the path of movement of said surface.

13. The apparatus of claim 12 wherein said element is pivotally mounted on said carriage.

14. The apparatus of claim 1 wherein said urging means exerts a torque on said element.

15. The palletizer of claim 12 wherein said carriage moving means moves said carriage in a direction substantially perpendicular to the movement of said hoist.

16. The apparatus of claim 12 further comprising a cam mounted on said housing and a cam follower mounted for movement with said element, the contour of said cam defining said first position of said element.

17. The apparatus of claim 16 wherein said urging means urges said cam follower towards said cam.

18. The apparatus of claim 16 wherein said cam follower contacts said cam at a given point when the exterior end of said element passes over the corner of the wall of the carton, as said carriage is moved in said second direction.

19. The apparatus of claim 18 wherein the movement of said element causes said cam follower to be spaced from said cam at one or more points along the contour of said cam prior to said given point.

20. The apparatus of claim 18 wherein said cam follower contacts said cam at all points along the contour thereof subsequent to said given point.

21. The apparatus of claim 12 wherein the initiation of the movement of the said means for moving said carriage is synchronized with the termination of the movement of the mechanism.

22. The apparatus of claim 12 wherein said control means actuates said carriage moving means.

* * * * *